United States Patent
Zhang et al.

(10) Patent No.: US 12,196,903 B2
(45) Date of Patent: Jan. 14, 2025

(54) METHOD AND SYSTEM FOR DETERMINING SEISMIC VELOCITIES USING GLOBAL PATH TRACING

(71) Applicant: SAUDI ARABIAN OIL COMPANY, Dhahran (SA)

(72) Inventors: Dongliang Zhang, Khobar (SA); Yi Luo, Dhahran (SA); Constantinos Tsingas, Dhahran (SA); Tong Wang Fei, Dhahran (SA); Hong Liang, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 416 days.

(21) Appl. No.: 17/644,532

(22) Filed: Dec. 15, 2021

(65) Prior Publication Data
US 2023/0184975 A1    Jun. 15, 2023

(51) Int. Cl.
*G01V 1/30*    (2006.01)
*G01V 1/28*    (2006.01)
*G01V 1/36*    (2006.01)

(52) U.S. Cl.
CPC .............. *G01V 1/301* (2013.01); *G01V 1/282* (2013.01); *G01V 1/362* (2013.01); *G01V 2210/52* (2013.01)

(58) Field of Classification Search
CPC ........ G01V 1/301; G01V 1/282; G01V 1/362; G01V 2210/52; G01V 1/30; G01V 1/303; G01V 2210/6222

(Continued)

(56) References Cited

U.S. PATENT DOCUMENTS 5,978,314 A    11/1999  Pham
6,263,284 B1   7/2001   Crider et al.
(Continued)

FOREIGN PATENT DOCUMENTS

CN    109031421 B    9/2019
CN    110471111 B    4/2020
(Continued)

OTHER PUBLICATIONS

Definition of Velocity Modeling, Cegal Dictionary, printed Feb. 29, 2024. (Year: 2024).*
(Continued)

*Primary Examiner* — Michael P Nghiem
(74) *Attorney, Agent, or Firm* — Osha Bergman Watanabe & Burton LLP

(57) ABSTRACT

A method may include obtaining seismic data for a geological region of interest. The method may further include determining various velocity semblance values for the geological region of interest using a time window and the seismic data. The method may further include determining, automatically by a computer processor, one or more stacking velocities for the geological region of interest using a traced path based on the velocity semblance values and a path tracing algorithm. The path tracing algorithm may recursively determine an accumulated amplitude array based on the velocity semblance values. The path tracing algorithm may further determine the traced path among the velocity semblance values and the accumulated amplitude array, the traced path corresponding to the one or more stacking velocities. The method may further include generating a velocity model of the geological region of interest using the one or more stacking velocities.

17 Claims, 8 Drawing Sheets

(58) Field of Classification Search
USPC .......................................................... 702/14
See application file for complete search history.

(56) References Cited

U.S. PATENT DOCUMENTS

| | | | |
|---|---|---|---|
| 6,952,379 | B2 | 10/2005 | Daube et al. |
| 10,942,287 | B2 | 3/2021 | Xia et al. |
| 2006/0250892 | A1 | 11/2006 | Siliqi et al. |
| 2009/0257308 | A1 | 10/2009 | Bevc et al. |
| 2010/0332139 | A1* | 12/2010 | Bruun ................ G01V 1/282 702/18 |
| 2012/0095690 | A1 | 4/2012 | Higginbotham et al. |
| 2015/0316673 | A1* | 11/2015 | Wiener ................ G01V 1/32 702/14 |
| 2021/0255349 | A1 | 8/2021 | Zhou et al. |
| 2022/0413172 | A1* | 12/2022 | Gashawbeza ........ G01V 1/282 |

FOREIGN PATENT DOCUMENTS

| | | |
|---|---|---|
| CN | 112464728 A | 3/2021 |
| WO | 2017/035104 A1 | 3/2017 |

OTHER PUBLICATIONS

De Souza, M.S. et al.; "Automatic velocity analysis using complex seismic traces"; 14th International Congress of the Brazilian Geophysical Society & EXPOGEF 2015 (5 pages).

Reiche, S et al.; "Automated Static and Moveout Corrections of High?resolution Seismic Data From the Baltic Sea"; Near Surface Geophysics, vol. 18, Issue 1, Sep. 9, 2019 (23 pages).

Khoury, A. et al.; "DSR Migration Velocity Analysis by Differential Semblance Optimization"; SEG Technical Program Expanded Abstracts 2006: SEG-2006-2450, Jan. 2006 (5 pages).

Hale, D.; "Dynamic warping of seismic images"; Geophysics, vol. 78, No. 2, pp. S105-S115, 2013 (11 pages).

Zhang, D. et al.; "Automatic First Arrival Piciing Workflow by Global Path Tracing"; Geophysics, vol. 87, No. 1, pp. U9-U20, 2022 (13 pages).

Wang, W. et al.; "Automatic velocity picking from semblances with a new deep-learning regression strategy: Comparison with a classification approach"; Geophysics, vol. 86, No. 2, pp. U1-U13, 2021 (13 pages).

* cited by examiner

METHOD AND SYSTEM FOR DETERMINING SEISMIC VELOCITIES USING GLOBAL PATH TRACING

BACKGROUND

Various seismic processing operations are performed on seismic data from a survey to convert time-based seismic data into a depth representation of a subsurface. For example, seismic processing operations may include surface multiple filtering and other noise removal operations. Likewise, seismic processing may also include application of seismic inversion techniques and migration algorithms with velocity models.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, seismic data for a geological region of interest. The method further includes determining, by the computer processor, various velocity semblance values for the geological region of interest using a time window and the seismic data. The method further includes determining, automatically by the computer processor, one or more stacking velocities for the geological region of interest using a traced path based on the velocity semblance values and a path tracing algorithm. The path tracing algorithm recursively determines an accumulated amplitude array based on the velocity semblance values. The path tracing algorithm further determines the traced path among the velocity semblance values and the accumulated amplitude array, the traced path corresponding to the one or more stacking velocities. The method further includes generating, by the computer processor, a velocity model of the geological region of interest using the one or more stacking velocities.

In general, in one aspect, embodiments relate to a system that includes a seismic surveying system that includes a seismic source and various seismic receivers. The system further includes a seismic interpreter that includes a computer processor. The seismic interpreter is coupled to the seismic surveying system. The seismic interpreter obtains seismic data for a geological region of interest. The seismic interpreter determines various velocity semblance values for the geological region of interest using a time window and the seismic data. The seismic interpreter determines automatically one or more stacking velocities for the geological region of interest using a traced path based on the velocity semblance values and a path tracing algorithm. The path tracing algorithm recursively determines an accumulated amplitude array based on the velocity semblance values. The path tracing algorithm further determines the traced path among the velocity semblance values and the accumulated amplitude array, the traced path corresponding to the one or more stacking velocities. The seismic interpreter generates a velocity model of the geological region of interest using the one or more stacking velocities.

In general, in one aspect, embodiments relate to a non-transitory computer readable medium storing instructions executable by a computer processor. The instructions obtain seismic data for a geological region of interest. The instructions determine various velocity semblance values for the geological region of interest using a time window and the seismic data. The instructions determine automatically one or more stacking velocities for the geological region of interest using a traced path based on the velocity semblance values and a path tracing algorithm. The path tracing algorithm recursively determines an accumulated amplitude array based on the velocity semblance values. The path tracing algorithm further determines the traced path among the velocity semblance values and the accumulated amplitude array, the traced path corresponding to the one or more stacking velocities. The instructions generate a velocity model of the geological region of interest using the one or more stacking velocities.

In some embodiments, a stacked image is generated by applying a normal moveout to various stacking velocities based on the path tracing algorithm. One or more parameters of the path tracing algorithm may be updated in response to determining that the stacked image fails to satisfy a predetermined criterion. In some embodiments, various common midpoints are determined based on the seismic data. A velocity semblance volume may be determined based on the plurality of common midpoints, wherein the velocity semblance values correspond to at least a portion of the velocity semblance volume. In some embodiments, a smoothing operation is performed to the velocity semblance volume in a common midpoint (CMP) direction to produce a smoothed volume, wherein the path tracing algorithm is applied to a respective two-dimensional slice of the smoothed volume. In some embodiments, the path tracing algorithm includes a strain factor based on a difference between a first path value and a second path value in the traced path, wherein the second path value corresponds to a time step that precedes the first path value, and wherein the strain factor is used to exclude one or more velocity semblance values from being used in determining the traced path. In some embodiments, the path tracing algorithm proceeds from an initial time step to a final time step in determining the accumulated amplitude array. The path tracing algorithm may proceed from the final time step to the initial time step in a backtracking process to determine the traced path. In some embodiments, a predetermined number of time steps are determined for constraining the path tracing algorithm in determining one or more path values. The path tracing algorithm may only allow various path values corresponding to the predetermined number of time steps to vary by a single sample in a stacking velocity dimension. In some embodiments, the path tracing algorithm uses an argmax function to determine the traced path. In some embodiments, one or more stacking velocities are used to correct the seismic data for normal moveout (NMO) to produce adjusted seismic data. The adjusted seismic data may include one or more adjusted arrival times of seismic events in one or more seismic traces based on varying source offsets or receiver offsets with a common midpoint. In some embodiments, a seismic image of the geological region of interest is generated using the velocity model. In some embodiments, a presence of hydrocarbons within the geological region of interest is determined using the velocity model.

In light of the structure and functions described above, embodiments of the invention may include respective means adapted to carry out various steps and functions defined above in accordance with one or more aspects and any one of the embodiments of one or more aspect described herein.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for using a path tracing algorithm to automatically determine stacking velocities based on velocity semblance values. In particular, the path tracing algorithm may implement global path tracing (GPT) to determine stacking velocities using two processes, i.e., an accumulation process and a backtracking process. The accumulation process may recursively determine an accumulated amplitude array (i.e., various accumulated amplitude values for multiple time steps) based on velocity semblance data. Likewise, the backtracking process may start at a final time step and work backwards to return to an initial time step to determine a traced path within the velocity semblance data. In other words, the path tracing algorithm may automatically and globally determine a traced path with a predetermined amount of energy (e.g., the maximum energy) based on velocity semblance values and the accumulated amplitude array. In some embodiments, the path tracing algorithm uses one or more constraints for achieving a predetermined smoothness of the traced path.

Furthermore, some embodiments may estimate one or more stacking velocities of a geological region based on the following operations: (1) scanning velocities within a certain range to determine a velocity semblance dataset or volume; and (2) selecting velocities with predetermined energies based on the velocity semblance values. Afterwards, the selected stacking velocities may be used to flatten and stack one or more CMP gathers, e.g., for quality checking.

Figure 1:
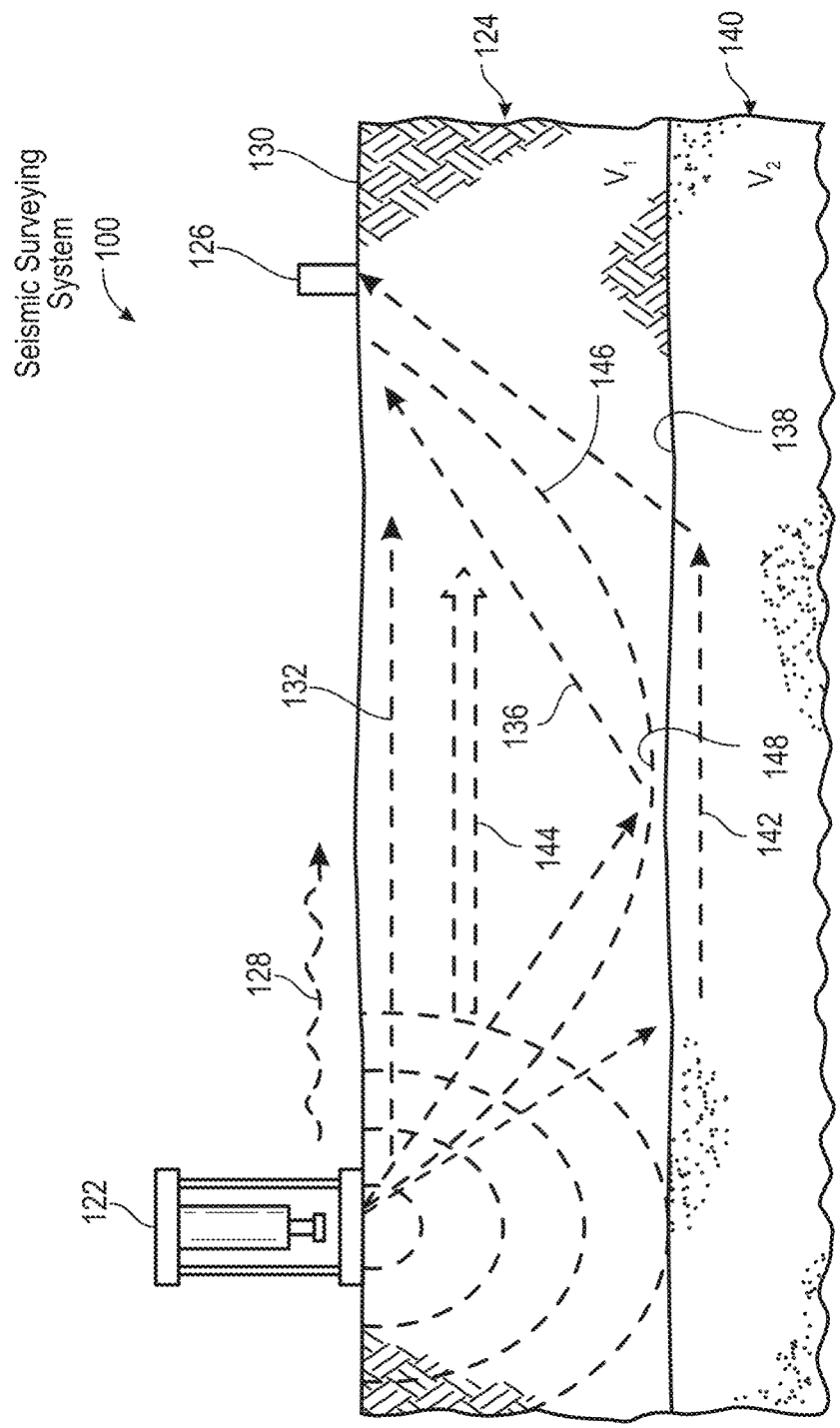
FIGS. 1 and 2 show systems in accordance with one or more embodiments.

Turning to FIG. 1, FIG. 1 shows a schematic diagram in accordance with one or more embodiments. As shown in FIG. 1, FIG. 1 illustrates a seismic surveying system (100) and various resultant paths of pressure waves (also called seismic waves). The seismic surveying system (100) includes a seismic source (122) that includes functionality for generating pressure waves, such as a reflected wave (136), refracting wave (142), or diving wave (146), through a subsurface layer (124). Pressure waves generated by the seismic source (122) may travel along several paths through a subsurface layer (124) at a velocity $V_1$ for detection at a number of seismic receivers (126) along the line of profile. Likewise, velocity may refer to multiple velocities types, such as the two types of particle motions resulting from a seismic wave, i.e., velocity of the primary wave (P-wave) and a different velocity of the secondary wave (S-wave) through a particular medium. The seismic source (122) may be a seismic vibrator, such as one that uses a vibroseis technique, an air gun in the case of offshore seismic surveying, explosives, etc. The seismic receivers (126) may include geophones, hydrophones, accelerometers, and other sensing devices. Likewise, seismic receivers (126) may include single component sensors and/or multi-component sensors that measure pressure waves in multiple spatial axes.

As shown in FIG. 1, the seismic source (122) generates an air wave (128) formed by a portion of the emitted seismic energy, which travels above the earth's surface (130) to the seismic receivers (126). The seismic source (122) may also emit surface waves (132), which travel along the earth's surface (130). The speed of the surface waves (132), also called Rayleigh waves or ground roll, may correspond to a velocity typically slower than the velocity of a secondary wave. While the seismic surveying shown in FIG. 1 is a two-dimensional survey along a seismic profile along a longitudinal direction, other embodiments are contemplated, such as three-dimensional surveys.

Furthermore, subsurface layer (124) has a velocity $V_1$, while subsurface layer (140) has a velocity $V_2$. In words, different subsurface layers may correspond to different velocity values. In particular, a velocity may refer to the speed that a pressure wave travels through a medium, e.g., diving wave (146) that makes a curvilinear ray path (148) through subsurface layer (124). Velocity may depend on a particular medium's density and elasticity as well as various wave properties, such as the frequency of an emitted pressure wave. Where a velocity differs between two subsurface layers, this seismic impedance mismatch may result in a seismic reflection of a pressure wave. For example, FIG. 1 shows a pressure wave transmitted downwardly from the seismic source (122) to a subsurface interface (138), which becomes a reflected wave (136) transmitted upwardly in response to the seismic reflection. The seismic source (122) may also generate a direct wave (144) that travels directly from the seismic source (122) at the velocity $V_1$ through the subsurface layer (124) to the seismic receivers (126).

Turning to refracted pressure waves and diving pressure waves, the seismic source (122) may also generate a refracted wave (i.e., refracting wave (142)) that is refracted at the subsurface interface (138) and travels along the subsurface interface (138) for some distance as shown in FIG. 1 until traveling upwardly to the seismic receivers (126). As such, refracted pressure waves (e.g., refracted wave (142)) may be analyzed to map the subsurface layers (124, 140). For example, a refracted wave is a wave that a portion of ray path is along an interface of a reflector as show in refracting wave (142) in FIG. 1 (i.e., refraction exists only when $V_2 > V_1$). On the other hand, a diving wave may be generated where velocities are gradually increasing with depth at a gradient (e.g., diving wave (146)), such that the diving wave may turn back along curvilinear ray path. Likewise, the apex of a diving wave may be consistent with a reflected seismic wave in a common midpoint (CMP) gather.

Furthermore, in analyzing seismic data acquired using the seismic surveying system (100), seismic wave propagation may be approximated using rays. For example, reflected waves (e.g., reflected wave (136)) and diving waves (e.g., diving wave (146)) may be scattered at the subsurface interface (138). In FIG. 1, for example, the diving wave (146) may exhibit a ray path of a wide angle that resembles a reflected wave in order to map the subsurface. Using diving waves, for example, a velocity model for an underlying subsurface may be generated that describes the velocity of different regions in different subsurface layers. An initial velocity model may be generated by modeling the velocity structure of media in the subsurface using an inversion of seismic data, typically referred to as seismic inversion. In seismic inversion, a velocity model is iteratively updated until the velocity model and the seismic data have a minimal amount of mismatch, e.g., the solution of the velocity model converges to a minimum that satisfies a predetermined criterion. For example, the optimization algorithm may be "linearized" and while achieving a "minimum", there may be no guarantee that it is a global minimum rather than a local minimum. Thus, it may be a simplification commonly adapted in solving inverse problems that works when a respective objective function is convex.

With respect to velocity models, a velocity model may map various subsurface layers based on velocities in different layer sub-regions (e.g., P-wave velocity, S-wave velocity, and various anisotropic effects in the sub-region). For example, a velocity model may be used with P-wave and S-wave arrival times and arrival directions to locate seismic events. Anisotropy effects may correspond to subsurface properties that cause pressure waves to be directionally dependent. Thus, seismic anisotropy may correspond to various parameters in geophysics that refers to variations of wave velocities based on direction of propagation. One or more anisotropic algorithms may be performed to determine anisotropic effects, such as an anisotropic ray-tracing location algorithm or algorithms that use deviated-well sonic logs, vertical seismic profiles (VSPs), and core measurements. Likewise, a velocity model may include various velocity boundaries that define regions where rock types changes, such as interfaces between different subsurface layers. In some embodiments, a velocity model is updated using one or more tomographic updates to adjust the velocity boundaries in the velocity model.

Figure 2:
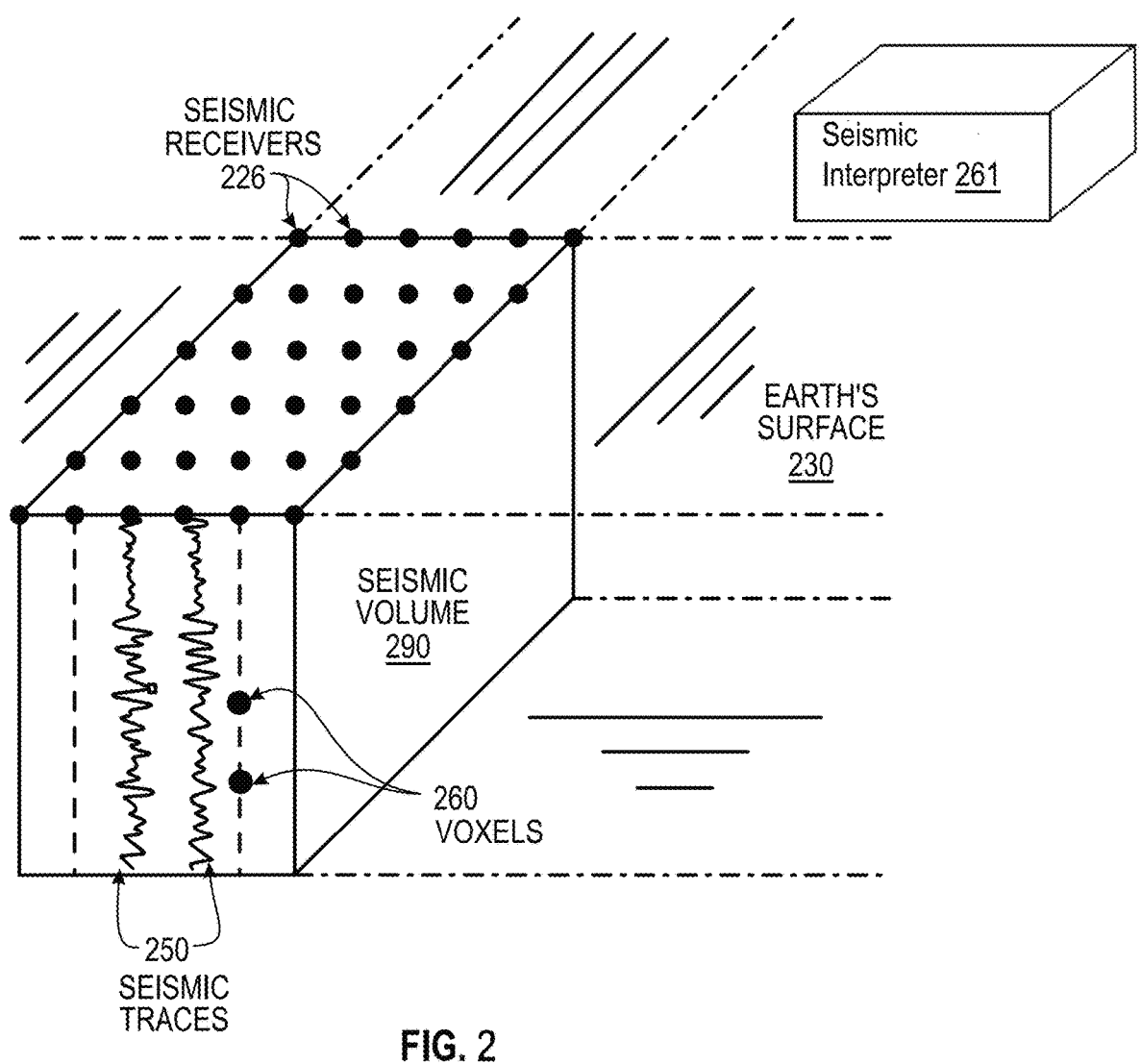

Turning to FIG. 2, FIG. 2 illustrates a system in accordance with one or more embodiments. As shown in FIG. 2, a seismic volume (290) is illustrated that includes various seismic traces (e.g., seismic traces (250)) acquired by various seismic receivers (e.g., seismic receivers (226)) disposed on the earth's surface (230). More specifically, a seismic volume (290) may be a cubic dataset of seismic traces. In particular, seismic data may have up to four spatial dimensions, one temporal dimension (i.e., related to the actual measurements stored in the traces), and possibly another temporal dimension related to time-lapse seismic surveys. Individual cubic cells within the seismic volume (290) may be referred to as voxels or volumetric pixels (e.g., voxels (260)). In particular, different portions of a seismic trace may correspond to various depth points within a volume of earth. To generate the seismic volume (290), a two-dimensional array of seismic receivers (226) are disposed along the earth's surface (230) and acquire seismic data in response to various pressure waves emitted by seismic sources. Within the voxels (260), statistics may be calculated on first break data that is assigned to a particular voxel to determine multimodal distributions of wave travel times and derive travel time estimates (e.g., according to mean, median, mode, standard deviation, kurtosis, and other suitable statistical accuracy analytical measures) related to azimuthal sectors. First break data may describe the onset arrival of refracted waves or diving waves at the seismic receivers (226) as produced by a particular seismic source signal generation.

Seismic data may refer to raw time domain data acquired from a seismic survey (e.g., acquired seismic data may result in the seismic volume (290)). However, seismic data may also refer to data acquired over different periods of time, such as in cases where seismic surveys are repeated to obtain time-lapse data. Seismic data may also refer to various seismic attributes derived in response to processing acquired seismic data. Furthermore, in some embodiments, seismic data may also refer to depth data or image data. Likewise, seismic data may also refer to processed data, e.g., using a seismic inversion operation, to generate a velocity model of a subterranean formation, or a migrated seismic image of a rock formation within the earth's surface. Seismic data may also be pre-processed data, e.g., arranging time domain data within a two-dimensional shot gather.

Furthermore, seismic data may include various spatial coordinates, such as (x,y) coordinates for individual shots and (x,y) coordinates for individual receivers. As such, seismic data may be grouped into common shot or common receiver gathers. In some embodiments, seismic data is grouped based on a common domain, such as common midpoint (i.e., Xmidpoint=(Xshot+Xrec)/2, where Xshot corresponds to a position of a shot point and Xrec corresponds to a position of a seismic receiver) and common offset (i.e., Xoffset=Xshot-Xrec).

In some embodiments, seismic data is processed to generate one or more seismic images. For example, seismic imaging may be performed using a process called migration. In some embodiments, migration may transform pre-processed shot gathers from a data domain to an image domain that corresponds to depth data. In the data domain, seismic events in a shot gather may represent seismic events in the subsurface that were recorded in a field survey. In the image domain, seismic events in a migrated shot gather may represent geological interfaces in the subsurface. Likewise, various types of migration algorithms may be used in seismic imaging. For example, one type of migration algorithm corresponds to reverse time migration. In reverse time migration, seismic gathers may be analyzed by: 1) forward modelling of a seismic wavefield via mathematical modelling starting with a synthetic seismic source wavelet and a velocity model; 2) backward propagating the seismic data via mathematical modelling using the same velocity model; 3) cross-correlating the seismic wavefield based on the results of forward modeling and backward propagating; and 4) applying an imaging condition during the cross-correlation to generate a seismic image at each time step. The imaging condition may determine how to form an actual image by estimating cross-correlation between the source wavefield with the receiver wavefield under the basic assumption that the source wavefield represents the downgoing wave-field and the receiver wave-field the up-going wave-field. In Kirchhoff and beam methods, for example, the imaging condition may include a summation of contributions resulting from the input data traces after the traces have been spread along portions of various isochrones (e.g., using principles of constructive and destructive interference to form the image).

Furthermore, seismic data processing may include various seismic data functions that are performed using various process parameters and combinations of process parameter values. For example, a seismic interpreter may test different parameter values to obtain a desired result for further seismic processing. Depending on the seismic data processing algorithm, a result may be evaluated using different types of seismic data, such as directly on processed gathers, normal moveout corrected stacks of those gathers, or on migrated stacks using a migration function. Where structural information of the subsurface is being analyzed, migrated stacks of data may be used to evaluate seismic noise that may overlay various geological boundaries in the subsurface, such as surface multiples (e.g., strong secondary reflections that are detected by seismic receivers). As such, migrated images may be used to determine impact of noise removal processes, while the same noise removal processes may operate on gather data.

While seismic traces with zero offset are generally illustrated in FIG. 2, seismic traces may be stacked, migrated and/or used to generate an attribute volume derived from the underlying seismic traces. For example, an attribute volume may be a dataset where the seismic volume undergoes one or more processing techniques, such as amplitude-versus-offset (AVO) processing. In AVO processing, seismic data may be classified based on reflected amplitude variations due to the presence of hydrocarbon accumulations in a subsurface formation. With an AVO approach, seismic attributes of a subsurface interface may be determined from the dependence of the detected amplitude of seismic reflections on the angle of incidence of the seismic energy. This AVO processing may determine both a normal incidence coefficient of a seismic reflection, and/or a gradient component of the seismic reflection. Likewise, seismic data may be processed according to a pressure wave's apex. In particular, the apex may serve as a data gather point to sort first break picks for seismic data records or traces into offset bins based on the survey dimensional data (e.g., the x-y locations of the seismic receivers (226) on the earth surface (230)). The bins may include different numbers of traces and/or different coordinate dimensions.

Additionally, seismic imaging may be near the end of a seismic data workflow before an analysis by a seismic interpreter. The seismic interpreter may subsequently derive understanding of the subsurface geology from one or more final migrated images. In order to confirm whether a particular seismic data workflow accurately models the subsurface, a normal moveout (NMO) stack may be generated that includes various NMO gathers with amplitudes sampled from a common midpoint (CMP). In particular, a NMO correction may be a seismic imaging approximation based on calculating reflection travel times. However, NMO-stack results may not indicate an accurate subsurface geology, where the subsurface geology is complex with large heterogeneities in velocities or when a seismic survey is not acquired on a horizontal plane. Ocean-Bottom-Node surveys and rough topographic land seismic surveys may be examples where NMO-stack results fail to depict subsurface geologies. In some embodiments, normal moveout may be expressed by the follow equation:

$$t_x^2 = t_0^2 + \frac{x^2}{v_{nmo}^2}, \quad (1)$$

where $v_{nmo}$, is the NMO velocity, x is the offset, $t_0$ is the two-way travel time at zero-offset, and $t_x$ is the two-way travel time for offset x. In particular, Equation (1) may describe a two-way travel time in an isotropic medium.

Keeping with NMO processing, a velocity analysis may be performed for each common midpoint that determines various normal-moveout stack velocities by means of a semblance summation along hyperbolic time trajectories. These semblance summations may produce a semblance map of velocity semblance values (i.e., $S(v_s, t_0)$), where stacking velocities are selected for multiple stack times to. For example, a velocity semblance map may describe stacking velocity $v_s$ versus travel time t using a mathematical model such as a polynomial fit. Stacking velocities $v_s$ may correspond to the root-mean-square velocity (i.e., $v_{rms}$). Where interval velocities and root-mean-square velocities may correspond to initial velocity distributions that are used for further seismic data processing. In particular, an interval velocity may be a velocity between two sequential reflections which may directly relate to geological formations, rock properties, and migration values. The relationship between interval velocity and stack velocity, $v_s$ may be used to produce various normal incidence sections within the subsurface. Likewise, a stacking velocity may provide a distance-time relationship that is used to correct the arrival times of seismic events in various seismic traces for varying offsets prior to summing, or stacking, the traces. Moreover, a semblance analysis may be performed by determining a velocity spectra or a semblance map to determine velocity values through different layers of a subsurface. Once the different velocities in the subsurface layers are known, a travel time may be determined for a pressure wave to travel the distance down to the midpoint between a seismic source and a seismic receiver for each of the subsurface layers. Accordingly, stacking velocity data may be used to correct the curves of the hyperbolas and create a flat line where all points are at an equal depth.

In some embodiments, stacking velocities are automatically selected in the semblance domain as part of an automated process. In particular, this automated process may be characterized as a nonlinear optimization problem. As such, a nonlinear solver may use a priori information and input-output constraints to manage local and global solutions to the nonlinear optimization problem. Examples of such constraints may include geological constraints (e.g., based on well logs), geometrical constraints, and physical parameters. Velocity semblance values may thus reflect how well the moveout path corresponds to a hypothesis NMO velocity fits the moveout of a seismic signal in the data. While a good fit may produce a peak in the semblance spectrum, a poor fit may produce velocity semblance values closer to zero. In some embodiments, velocity semblance values are determined using the following equation:

$$s(t, v_{nmo}(t)) = \frac{\sum_{\tau=t-M}^{t+M} \left( \sum_{k=0}^{N-1} d_{nmo}(\tau, i) \right)^2}{N \sum_{\tau=t-M}^{t+M} \sum_{i=0}^{N-1} (d_{nmo}(\tau, i))^2}, \quad (2)$$

where $d_{nmo}(\tau, i)$ is the moveout corrected CMP gather for the $i^{th}$ offset at time T through Equation 1 using the velocity $v_{nmo}(t)$, and 2 M+1 is the time window for a velocity semblance.

A whole velocity semblance may be determined by scanning the NMO velocity in a certain range from low to high velocity with a given time window.

Turning to the seismic interpreter (261), a seismic interpreter (261) (also called a "seismic processing system") may include hardware and/or software with functionality for storing the seismic volume (290), well logs, core sample data, and other data for seismic data processing, well data processing, and other data processes accordingly. In some embodiments, the seismic interpreter (261) may include a computer system that is similar to the computer (602) described below with regard to FIG. 6 and the accompanying description. While a seismic interpreter may refer to one or more computer systems that are used for performing seismic data processing, the seismic interpreter may also refer to a human analyst performing seismic data processing in connection with a computer. While the seismic interpreter (261) is shown at a seismic surveying site, in some embodiments, the seismic interpreter (261) may be remote from a seismic surveying site.

Figure 3:
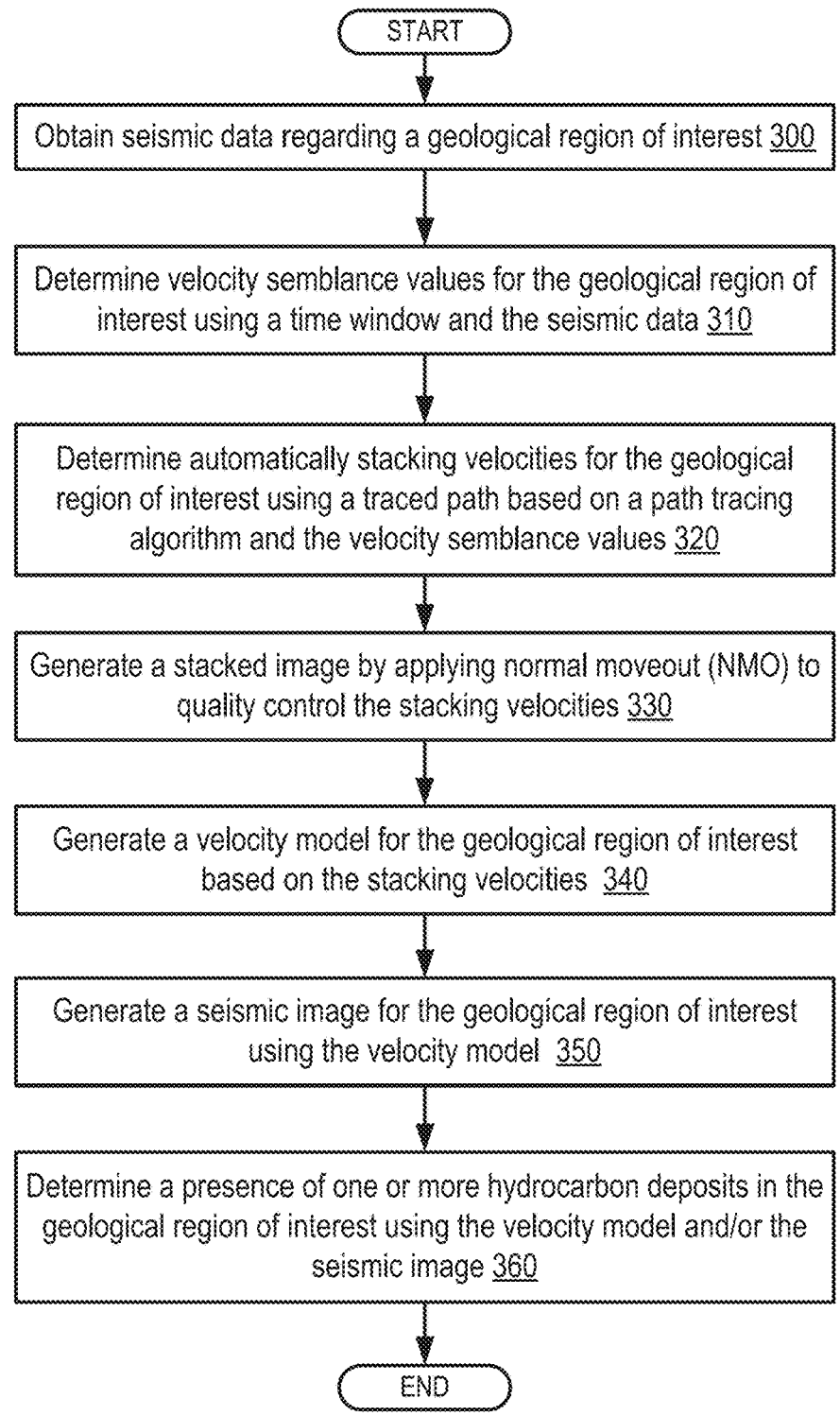
FIG. 3 shows a flowchart in accordance with one or more embodiments.

Turning to FIG. 3, FIG. 3 shows a flowchart in accordance with one or more embodiments. Specifically, FIG. 3 describes a general method for determining stacking velocities for a velocity model automatically using a path tracing algorithm. One or more blocks in FIG. 3 may be performed by one or more components (e.g., seismic interpreter (261)) as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, seismic data are obtained regarding a geological region of interest in accordance with one or more embodiments. A geological region of interest may be a portion of a geological area or volume that includes one or more formations of interest desired or selected for analysis, e.g., for determining location of hydrocarbons or reservoir development purposes. The seismic data may be similar to the seismic data described above in FIGS. 1 and 2 and the accompanying description.

In Block 310, various velocity semblance values are determined for a geological region of interest using a time window and seismic data in accordance with one or more embodiments. In some embodiments, the velocity semblance values may be similar to the semblance values described above with respect to FIG. 2 and Equation 1, and the accompanying description.

In Block 320, various stacking velocities are determined for a geological region of interest automatically using a traced path based on a path tracing algorithm and various velocity semblance values in accordance with one or more embodiments. More specifically, a seismic interpreter may use a path tracing algorithm to determine automatically a traced path corresponding to various stacking velocities in a geological region. For example, the traced path may be used for performing NMO corrections to seismic survey data. The path tracing algorithm may be a dynamic programming algorithm that provides a global search of velocity semblance data (e.g., using Equations 3-5 described below). In a global search, the path tracing algorithm may analyze both the current, previous, and/or following time steps simultaneously in order to determine a path value that satisfies one or more algorithm constraints. In some embodiments, for example, a path tracing algorithm includes an accumulation process and a backtracking process.

In some embodiments, a seismic interpreter uses a velocity semblance s(t,v) at one CMP location to determine one or more stacking velocities. The velocity semblance may have a path with the maximum accumulated amplitude. For example, a traced path may be described as a n×m 2D array. To track this path, an optimization problem may be used. In some embodiments, for example, the optimization problem is expressed using the following equations:

$$p(i) = \underset{j}{\mathrm{argmax}} \sum_{k=0}^{n-1} s(i, j)  \qquad \text{Equation (3)}$$

$$0 \leq j < m \qquad \text{Equation (4)}$$

where Equation (3) may be subject to the following strain factor constraint:

$$p(i)-p(i-1) \leq c \qquad \text{Equation(5)}$$

The above optimization problem may be solved by searching various globally possible paths to find a traced path with a maximum accumulated amplitude subject to constraint of Equation 5. The variables i and j may correspond to the indices of the vertical (time t direction) and horizontal (velocity direction) semblance points, respectively. Moreover, p(i) may be defined as a path value sample that includes a traced path with a maximum amplitude. Furthermore, the optimization problem may include a strain factor, such as strain factor c in Equation (5), that controls a predetermined amount of variation in adjacent time steps along the traced path.

Without using one or more constraints (such as the strain factor c in Equation 5), a solution for the optimization problem may be obtained by connecting the time steps with a maximum amplitude at each row of velocity semblance s(i,j). However, this traced path may have many jumps without being consistent because no constraint exists on the adjacent time steps along this traced path. In order to find a consistent and smoothly varied traced path for determining stacking velocities, a strain factor or other constraint may be necessary and important. In some embodiments, for example, a strain factor is expressed using the following equation:

$$c = \frac{1}{\iota}, \iota = 1,2,3, \ldots , \qquad \text{Equation (6)}$$

where the strain factor c≤1 and ι corresponds to a predetermined number of adjacent time steps that are allowed to vary one sample.

Turning to accumulation processes, for example, the path tracing algorithm may recursively determine an accumulated amplitude array based on various velocity semblance values (e.g., velocity semblance values based on seismic data acquired in a seismic survey and Equation 2 above). The accumulated amplitude array may be determined by summing velocity semblance values at different time steps to produce an accumulated amplitude array that includes amplitude values at each time step. In particular, the accumulation step may recursively determine an accumulated amplitude array sum(i,j) from input data (e.g., velocity semblance values based on seismic data). In some embodiments, the accumulated amplitude array is determined using the following equations:

$$\text{sum }(0, j) = s(0, j),\quad \text{Equations (7)}$$

$$\text{sum }(i, j) =$$

$$s(i,j) + \max\begin{cases} \text{sum }(i-l, j-1) + s(i-l+1, j-1) + \ldots + s(i-1, j-1) \\ \text{sum }(i-1, j) \\ \text{sum }(i-l, j+1) + s(i-l+1, j+1) + \ldots + s(i-1, j+1) \end{cases},$$

$$0 \le j < m,$$

$$i = 1, 2, \ldots, n-1.$$

where accumulated amplitude values in the accumulated amplitude array sum(i,j) that exceed the boundary (e.g., a strain factor or other constraint) in the time and velocity dimension are not used to determine a final accumulated amplitude array.

Turning to backtracking processes, the path tracing algorithm may backtrack a traced path with a maximum amplitude, beginning with the last time step (e.g., p(n−1)) and ending with the initial time step (e.g., p(0)). In some embodiments, a traced path is determined according to the following equations:

$$p(n-1) = \underset{j}{\operatorname{argmax}} \text{ sum }(n-1, j),\quad \text{Equations (8)}$$

$$0 \le j < m,$$

$$p(i-k-1) = \underset{\{p(i)-1, p(i), p(i)+1\}}{\operatorname{argmax}} \begin{cases} \text{sum }(i-l, p(i)-1) + s(i-l+1, \\ p(i)-1) + \ldots + s(i-1, p(i)-1) \\ \text{sum }(i-1, p(i)) \\ \text{sum }(i-l, p(i)+1) + s(i-l+1, \\ s(i)+1) + \ldots + s(i-1, p(i)+1) \end{cases},$$

$$i = n-1, n-2, \ldots, 1,$$

$$k = 0, 1, \ldots, l-1.$$

As shown in the above equations, p(n) may corresponds to path values in a traced path, i and j may correspond to time step and velocity indices, k may correspond to a previous time step, ι may correspond to a predetermined number of time steps in a global constraining function, argmax corresponds to a function based on an arguments of a maxima, sum corresponds to a summing function (e.g., a function that adds values (e.g., adds velocity semblance values in an accumulation step). Rather than using a 2 M+1 time window to smooth velocity semblance data here, the predetermined number of time steps ι are used to accumulate the smoothed data. Thus, the accumulation may act as a smoothing operator. In some embodiments, path values at the previous ι time steps are used for constraining. For example, if any time step changes at one path value on a traced path, the traced path may be backtracked with no change to the previous ι time steps. In other words, a bundle of ι time steps on a traced path may be only allowed to vary one path value in the velocity dimension.

Furthermore, while the above equations may describe path tracing on velocity semblance values at one CMP location, other embodiments are contemplated that used multiple CMP locations. For multiple CMP locations, the velocity semblance values may correspond to a three dimensional semblance volume (e.g., a semblance volume defined by s(t, v, cmp)). To keep continuity between adjacent CMP locations, an initial smoothing operation may be applied to the semblance volume in the CMP direction. Afterwards, a path tracing algorithm may be applied to each slice of the semblance volume (e.g., a two dimension velocity semblance s(t,v) based on the three dimensional velocity semblance data). An accumulation operator similar to the accumulation process described above may be used as a smoothing operator for the semblance volume in CMP direction.

In Block 330, a stacked image is generated by applying normal moveout (NMO) to quality control (QC) various stacking velocities in accordance with one or more embodiments. For example, if the stacked image does not satisfy one or more predetermined criteria, Block 320 may be repeated using different parameters for a path tracing algorithm. Thus, the path tracing algorithm may be readjusted until a desired quality level is achieved in one or more stacked images.

Figure 4A:
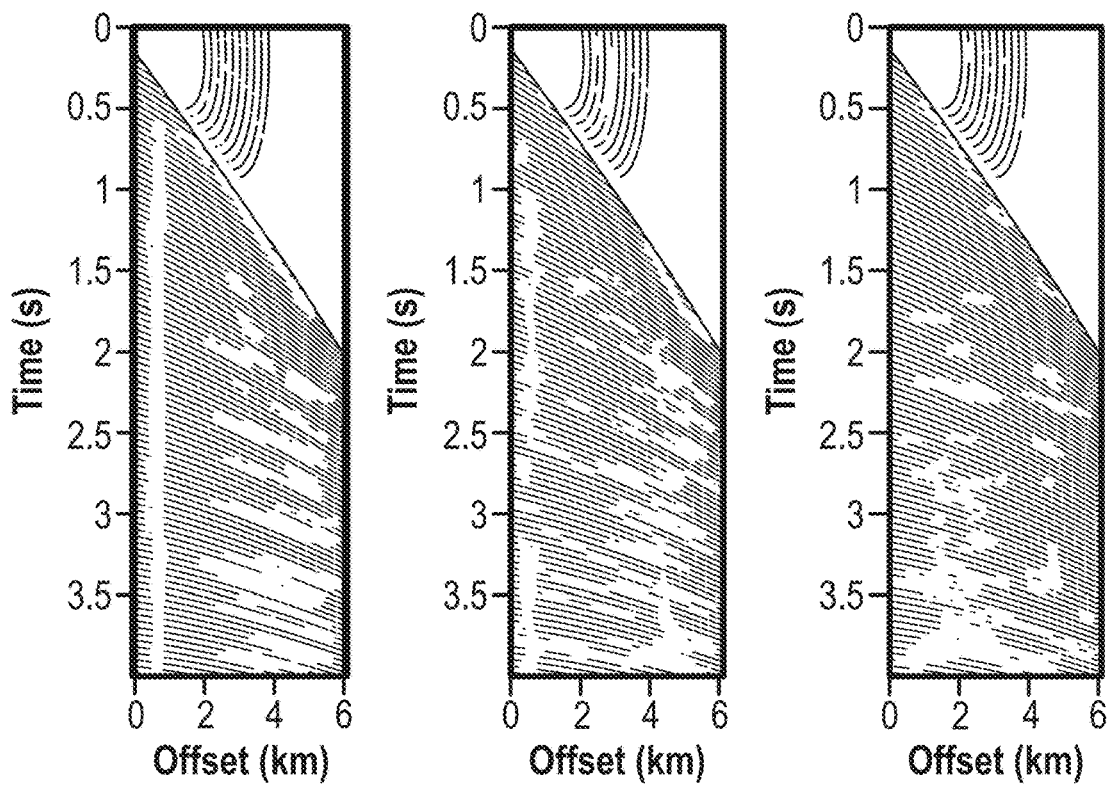
FIGS. 4A, 4B, 4C, 4D, 4E, and 5 show examples in accordance with one or more embodiments.
Figure 4B:
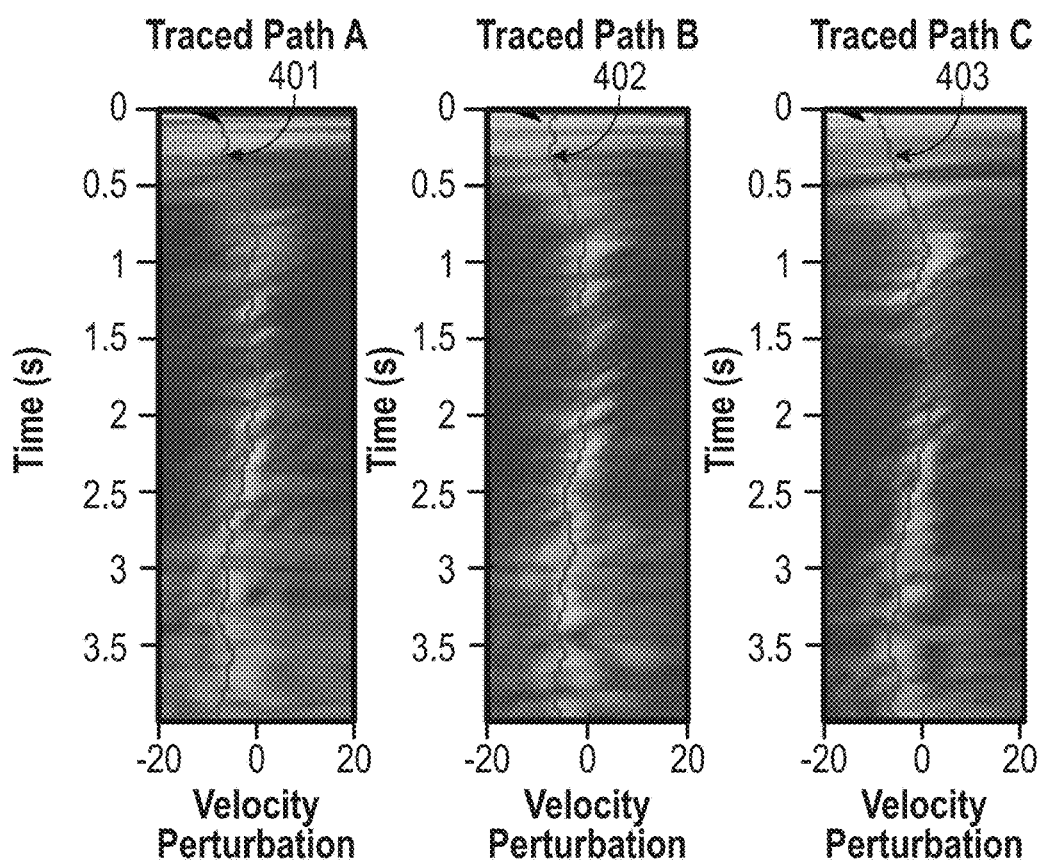
Figure 4C:
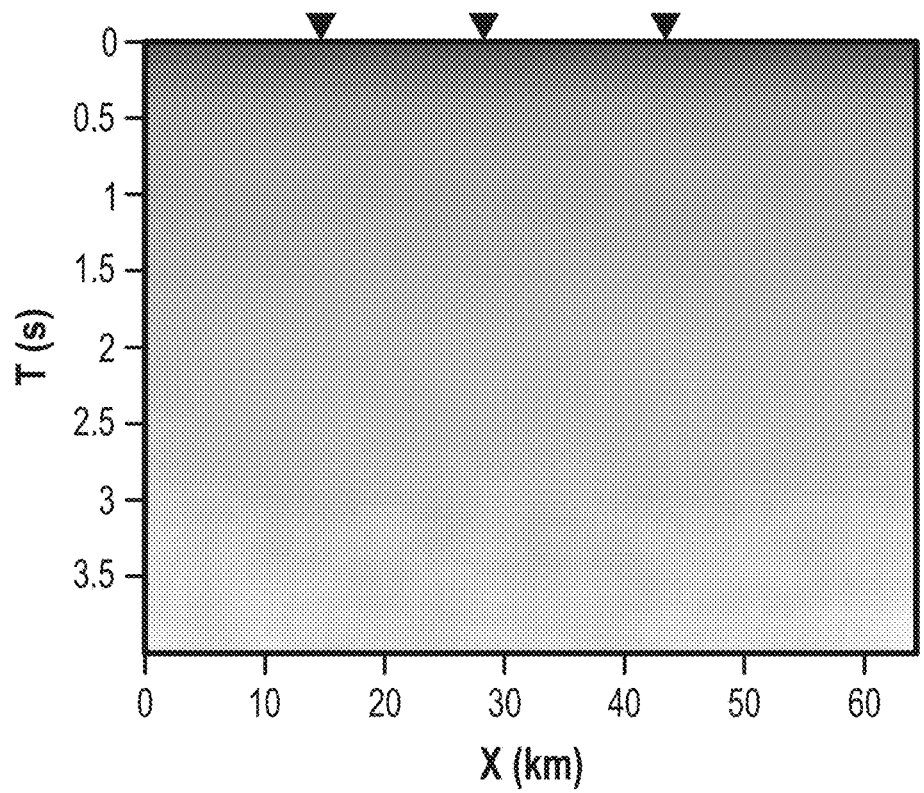

Turning to FIGS. 4A, 4B, 4C, 4D, and 4E, FIGS. 4A-4E illustrate examples in accordance with one or more embodiments. In FIG. 4A, three CMP gathers are shown based on a field dataset that has been tested using a path tracing algorithm to select a stacking velocity. FIG. 4A may be used to locate at positions indicated by reverse triangles in FIG. 4C. Using Equation 2 described above, various velocity semblances are determined accordingly, where the velocity semblance values are shown in FIG. 4B. Thus, the locations in FIG. 4B correspond to the three triangle locations as shown in FIG. 4C. In FIG. 4B, the vertical axis corresponds to time (e.g., multiple time steps) and the horizontal axis is velocity perturbation. Thus, velocity semblance values may describe a velocity spectrum where the path tracing algorithm may scan possible velocity values within a certain range to determine the stacking velocity. By applying a path tracing algorithm based on the velocity semblance values, the stacking velocity with the maximum energy is picked which is indicated by the black line (i.e., traced path A (401), traced path B (402), and traced path C (403)). By applying the path tracing algorithm repeatedly for each CMP location, a final selected stacking velocity is show in FIG. 4C. To verify the automated process for determining stacking velocity, NMO is applied to the three gathers shown in FIG. 4A. The corresponding results shown in FIG. 4D, where the seismic events are mostly flattened. Accordingly, the stacking velocity determined from the automated process is shown as accurate in this example.

Figure 4D:
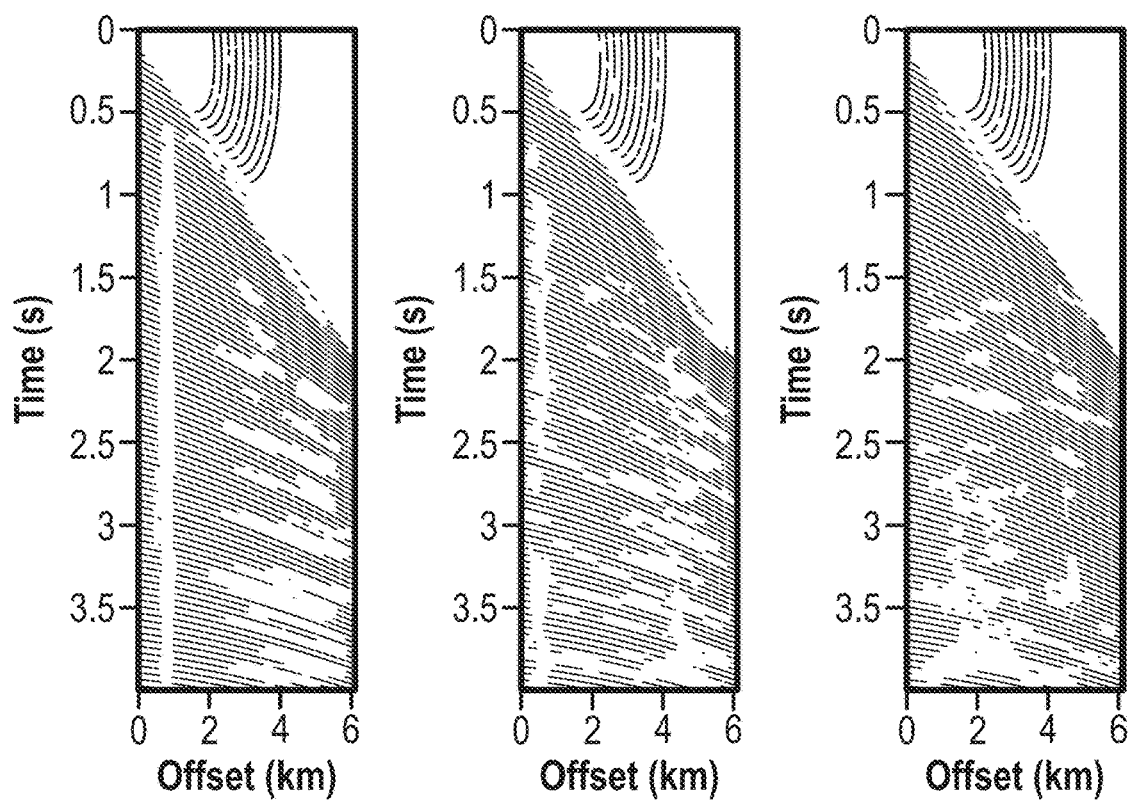
Figure 4E:
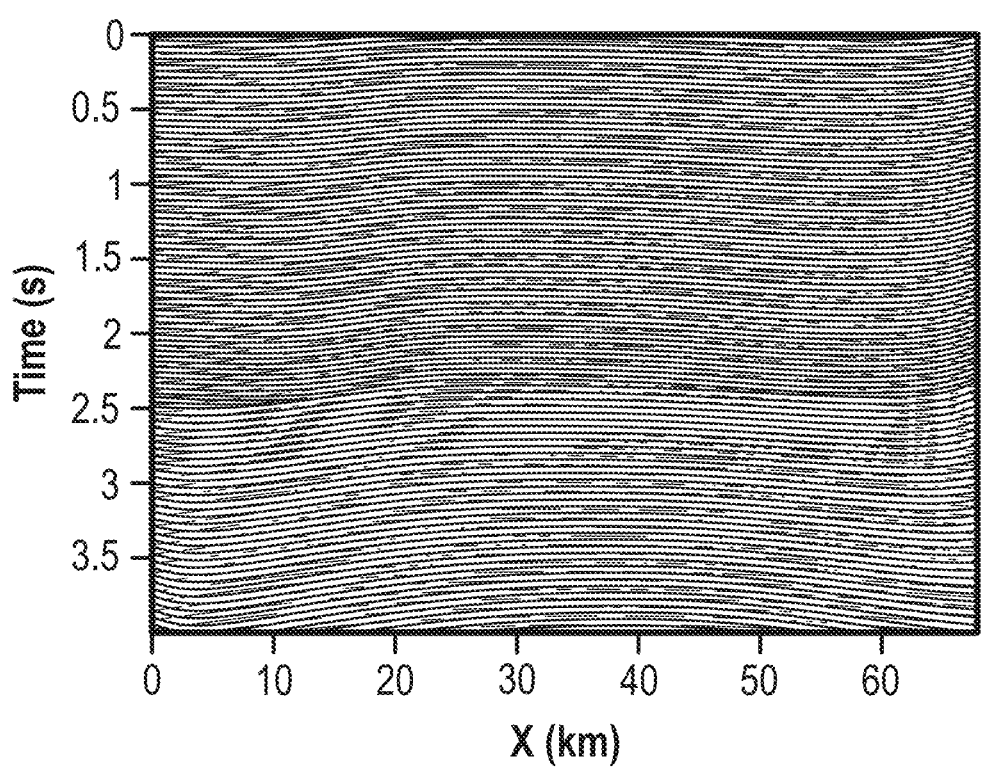

As such, the whole section of the selected stacking velocities are used to run NMO corrections and stack processing to generate a final stack image is shown in FIG. 4E. If the NMO applied to the gathers shown in FIG. 4D are not flattened or the stack image shown in FIG. 4E is not well imaged, parameters of the path tracing algorithm may be readjusted (e.g., based on the number of time steps used in the strain factor) to rerun the automated process.

In Block 340, a velocity model is generated for a geological region of interest based on various stacking velocities in accordance with one or more embodiments. For example, the velocity model may be a final quality controlled velocity model based on the process in Blocks 320 and 330.

In Block 350, a seismic image is generated for a geological region of interest using a velocity model in accordance with one or more embodiments. For example, a set of migrated gathers may be summed or stacked to produce a final seismic image. In some embodiments, the seismic image provides a spatial and depth illustration of a subsurface formation for various practical applications, such as predicting hydrocarbon deposits, predicting wellbore paths for geosteering, etc.

In Block 360, a presence of one or more hydrocarbon deposits are determined in a geological region of interest using a velocity model and/or a seismic image in accordance with one or more embodiments.

Figure 5:
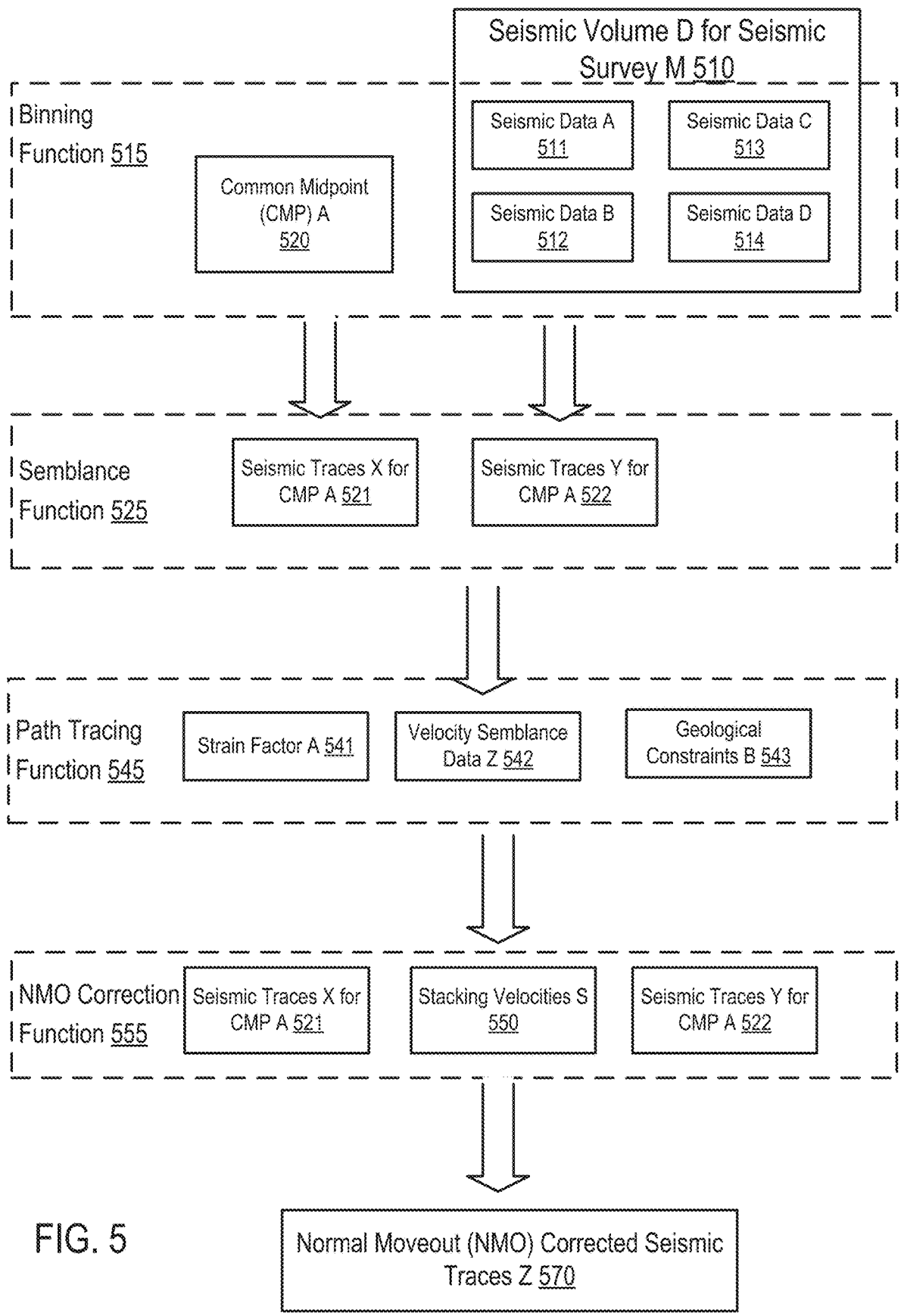

Turning to FIG. 5, FIG. 5 provides an example of determining stacking velocities using a path tracing algorithm in accordance with one or more embodiments. The following example is for explanatory purposes only and not intended to limit the scope of the disclosed technology.

In FIG. 5, a seismic interpreter (not shown) obtains a seismic volume D (510) for a seismic survey M, where the seismic volume D (510) includes seismic data A (511), seismic data B (512), seismic data C (513), and seismic data D (514). The seismic interpreter selects a common midpoint (CMP) A (520) and uses a binning function (515) to determine several seismic traces for analysis, i.e., seismic traces X for CMP A (521) and seismic traces Y for CMP A (522). Using the seismic traces (521, 522), the seismic interpreter uses a semblance function (525) to produce velocity semblance data Z (542), where the velocity semblance data Z (542) describes various velocity semblance values for a geological region. The velocity semblance data Z (542) is used as an input along with a strain factor A (541) and various geological constraints B (543) to a path tracing function (545). Using the path tracing function (545), the seismic interpreter determines stacking velocities S (550) for the respective geological region. Finally, the seismic interpreter uses the stacking velocities S (550) with an NMO correction function (555) to generate NMO corrected seismic traces Z (570) based on seismic traces X (521) and seismic traces Y (522).

Computer System

Figure 6:
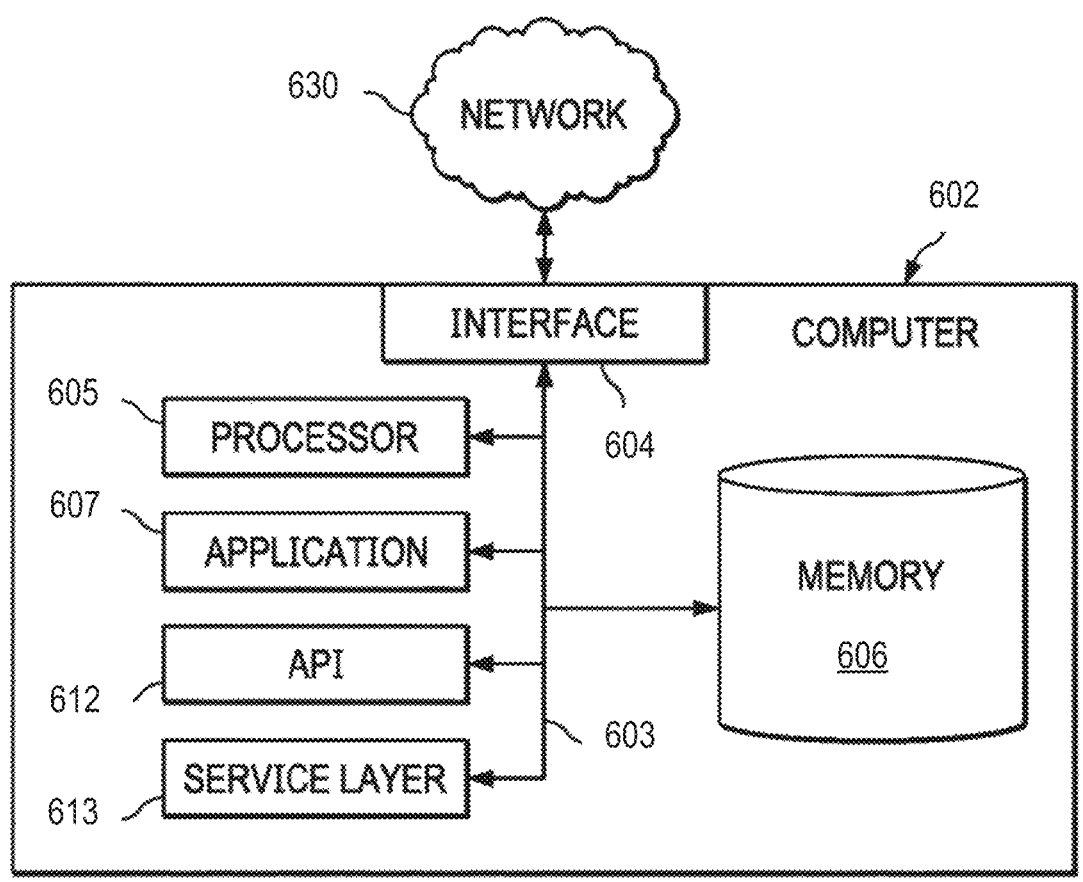
FIG. 6 shows a computing system in accordance with one or more embodiments.

Embodiments may be implemented on a computer system. FIG. 6 is a block diagram of a computer system used to provide computational functionalities associated with described algorithms, methods, functions, processes, flows, and procedures as described in the instant disclosure, according to an implementation. The illustrated computer (602) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630) or cloud. In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) or cloud from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630) or cloud. More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), artificial intelligence as a service (AIaaS), serverless computing, and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
   obtaining, by a computer processor, seismic data for a geological region of interest;
   determining, by the computer processor, a plurality of common midpoints based on the seismic data;
   obtaining, by the computer processor, a velocity semblance volume based on the plurality of common midpoints;
   wherein the plurality of velocity semblance values correspond to at least a portion of the velocity semblance volume;
   performing a smoothing operation to the velocity semblance volume in a common midpoint (CMP) direction to produce a smoothed volume;
   determining, by the computer processor, a plurality of velocity semblance values for the geological region of interest using a time window and the smoothed volume;
   determining, automatically by the computer processor, one or more stacking velocities for the geological region of interest using a traced path based on the plurality of velocity semblance values and a path tracing algorithm,
   wherein the path tracing algorithm recursively determines an accumulated amplitude array based on the plurality of velocity semblance values, and
   wherein the path tracing algorithm further determines the traced path among the plurality of velocity semblance values and the accumulated amplitude array, the traced path corresponding to the one or more stacking velocities, and
   wherein the path tracing algorithm is applied to a respective two-dimensional slice of the smoothed volume; and
   generating, by the computer processor, a velocity model of the geological region of interest using the one or more stacking velocities.

2. The method of claim 1, further comprising:
   generating, by the computer processor, a stacked image by applying a normal moveout to a plurality of stacking velocities based on the path tracing algorithm; and
   updating, by the computer processor, one or more parameters of the path tracing algorithm in response to determining that the stacked image fails to satisfy a predetermined criterion.

3. The method of claim 1,
   wherein the path tracing algorithm comprises a strain factor based on a difference between a first path value and a second path value in the traced path,
   wherein the second path value corresponds to a time step that precedes the first path value, and
   wherein the strain factor is used to exclude one or more velocity semblance values from being used in determining the traced path.

4. The method of claim 1,
wherein the path tracing algorithm proceeds from an initial time step to a final time step in determining the accumulated amplitude array, and
wherein the path tracing algorithm proceeds from the final time step to the initial time step in a backtracking process to determine the traced path.

5. The method of claim 1, further comprising:
determining a predetermined number of time steps for constraining the path tracing algorithm in determining one or more path values,
wherein the path tracing algorithm only allows a plurality of path values corresponding to the predetermined number of time steps to vary by a single sample in a stacking velocity dimension.

6. The method of claim 1,
wherein the path tracing algorithm uses an argmax function to determine the traced path.

7. The method of claim 1,
wherein the one or more stacking velocities are used to correct the seismic data for normal moveout (NMO) to produce adjusted seismic data, and
wherein the adjusted seismic data comprises one or more adjusted arrival times of seismic events in one or more seismic traces based on varying source offsets or receiver offsets with a common midpoint.

8. The method of claim 1, further comprising:
generating, by the computer processor, a seismic image of the geological region of interest using the velocity model.

9. The method of claim 1, further comprising:
determining, by the computer processor and using the velocity model, a presence of hydrocarbons within the geological region of interest.

10. A system, comprising:
a seismic surveying system comprising a seismic source and a plurality of seismic receivers; and
a seismic interpreter comprising a computer processor, wherein the seismic interpreter is coupled to the seismic surveying system, the seismic interpreter comprising functionality for:
obtaining seismic data for a geological region of interest;
determining a plurality of velocity semblance values for the geological region of interest using a time window and the seismic data;
determining automatically a plurality of stacking velocities for the geological region of interest using a traced path based on the plurality of velocity semblance values and a path tracing algorithm,
wherein the path tracing algorithm recursively determines an accumulated amplitude array based on the plurality of velocity semblance values, and
wherein the path tracing algorithm further determines the traced path among the plurality of velocity semblance values and the accumulated amplitude array, the traced path corresponding to the plurality of stacking velocities;
generating a stacked image by applying a normal moveout to the plurality of stacking velocities based on the path tracing algorithm;
updating one or more parameters of the path tracing algorithm in response to determining that the stacked image fails to satisfy a predetermined criterion; and
generating a velocity model of the geological region of interest using the plurality of stacking velocities and the one or more parameters of the path tracing algorithm that are updated.

11. The system of claim 10, wherein the seismic interpreter further comprises functionality for:
determining a plurality of common midpoints based on the seismic data; and
obtaining a velocity semblance volume based on the plurality of common midpoints,
wherein the plurality of velocity semblance values correspond to at least a portion of the velocity semblance volume.

12. The system of claim 10,
wherein the path tracing algorithm comprises a strain factor based on a difference between a first path value and a second path value in the traced path,
wherein the second path value corresponds to a time step that precedes the first path value, and
wherein the strain factor is used to exclude one or more velocity semblance values from being used in determining the traced path.

13. The system of claim 10, wherein the seismic interpreter further comprises functionality for:
determining a predetermined number of time steps for constraining the path tracing algorithm in determining one or more path values,
wherein the path tracing algorithm only allows a plurality of path values corresponding to the predetermined number of time steps to vary by a single sample in a stacking velocity dimension.

14. The system of claim 10,
wherein the plurality of stacking velocities are used to correct the seismic data for normal moveout (NMO) to produce adjusted seismic data, and
wherein the adjusted seismic data comprises one or more adjusted arrival times of seismic events in one or more seismic traces based on varying source offsets or receiver offsets with a common midpoint.

15. The system of claim 10, wherein the seismic interpreter further comprises functionality for:
generating a seismic image of the geological region of interest using the velocity model.

16. The system of claim 10, wherein the seismic interpreter further comprises functionality for:
determining, using the velocity model, a presence of hydrocarbons within the geological region of interest.

17. A non-transitory computer readable medium storing instructions executable by a computer processor, the instructions comprising functionality for:
obtaining seismic data for a geological region of interest;
determining a plurality of velocity semblance values for the geological region of interest using a time window and the seismic data;
determining automatically one or more stacking velocities for the geological region of interest using a traced path based on the plurality of velocity semblance values and a path tracing algorithm,
wherein the path tracing algorithm recursively determines an accumulated amplitude array based on the plurality of velocity semblance values, and
wherein the path tracing algorithm further determines the traced path among the plurality of velocity semblance values and the accumulated amplitude array, the traced path corresponding to the one or more stacking velocities;
generating a velocity model of the geological region of interest using the one or more stacking velocities; and generating a seismic image of the geological region of interest using the velocity model.

* * * * *